(12) United States Patent
Liang

(10) Patent No.: US 7,622,314 B2
(45) Date of Patent: Nov. 24, 2009

(54) CARBON NANOTUBE STRUCTURES AND METHODS OF MANUFACTURE AND USE

(75) Inventor: Kangning Liang, Bartlett, TN (US)

(73) Assignee: Brother International Corporation, Bridgewater, NJ (US)

( * ) Notice: Subject to any disclaimer, the term of this patent is extended or adjusted under 35 U.S.C. 154(b) by 0 days.

(21) Appl. No.: 11/381,983

(22) Filed: May 5, 2006

(65) Prior Publication Data

US 2007/0259462 A1 Nov. 8, 2007

(51) Int. Cl.
*H01L 21/62* (2006.01)

(52) U.S. Cl. .............................. 438/22; 438/20; 438/26; 257/E23.09; 257/E21.52; 257/E21.002; 313/317; 313/343; 313/345; 977/764; 977/762; 977/950; 977/951

(58) Field of Classification Search .................... 438/20, 438/22, 26; 257/E23.09, E21.52, E21.002; 313/317, 343, 345; 977/762, 764, 950, 951
See application file for complete search history.

(56) References Cited

U.S. PATENT DOCUMENTS

| | | | |
|---|---|---|---|
| 6,299,812 B1 * | 10/2001 | Newman et al. | ......... 264/176.1 |
| 6,656,339 B2 | 12/2003 | Talin et al. | |
| 6,667,572 B2 | 12/2003 | Lewis | |
| 6,899,854 B2 | 5/2005 | Darty | |
| 2001/0054517 A1 | 12/2001 | Conklan et al. | |
| 2003/0094898 A1 | 5/2003 | Lewis | |
| 2003/0227243 A1 | 12/2003 | Perlo et al. | |
| 2004/0051432 A1 | 3/2004 | Jiang et al. | |
| 2004/0091285 A1 | 5/2004 | Lewis | |
| 2004/0096389 A1 | 5/2004 | Lobovsky et al. | |
| 2004/0113980 A1 | 6/2004 | Lewis et al. | |
| 2004/0179258 A1 | 9/2004 | Li et al. | |
| 2004/0266063 A1 * | 12/2004 | Montgomery et al. | ........ 438/119 |
| 2005/0266605 A1 * | 12/2005 | Kawakami | ................... 438/99 |
| 2006/0063464 A1 * | 3/2006 | Kang et al. | .................... 445/51 |
| 2006/0202168 A1 * | 9/2006 | Barrera et al. | ............... 252/500 |

OTHER PUBLICATIONS

Lau et al., The revoloutionary creation of new advanced materials-carbon nanotube composits, Composits: Part B, 33 (2002), pp. 263-277.*
Ania, Physical ageing and glass transition in amorphous polymers as revealed by microhardness, J. Mat. Res. 24, 1989, 2934-2938.*
Wei, Multifunctional Chemical Vapor Sensors of Aligned Carbon Nanotube and Polymer Composites, J. Am. Chem. Soc. 128, 1412-1413, 2006.*

(Continued)

*Primary Examiner*—Kiesha L. Rose
*Assistant Examiner*—Minchul Yang
(74) *Attorney, Agent, or Firm*—Darby & Darby PC

(57) ABSTRACT

A method of making a carbon nanotube structure includes forming a plurality of carbon nanotubes and contacting the carbon nanotubes with a polymer. A solid composition is formed from the carbon nanotubes and polymer and then shaped. For example, the solid composition can be shaped into an elongated structure such as a filament, wire, rope, cable, and the like. In at least some instances, at least some, or all, of the polymer is removed from the solid composition after it is shaped.

19 Claims, 3 Drawing Sheets

OTHER PUBLICATIONS

Hinds, Aligned Multiwalled Carbon Nanotube Membranes, Science 303, 62-65, 2004.*

Dresselhaus et al., "Carbon Nanotubes," Physics World, Jan. 1998.

Choi et al., "Fully Sealed, High-Brightness Carbon-Nanotube Field-Emission Display," Applied Physics Letters, vol. 75, No. 20. Nov. 15, 1999.

Nilsson et al., "Scanning Field Emission from Patterned Carbon Nanotube Films," Applied Physics Letters, vol. 76, No. 15, Apr. 10, 2000.

Jamieson, "Carbon Nanotubes Roll On," Physics World, Jun. 2000.

Tao et al., "Field Emission from Dense, Sparse, and Patterned Arrays of Carbon Nanofibers," Applied Physics Letters, vol. 80, No. 11, Mar. 18, 2002.

Wei et al., "Carbon Nanotube Filaments in Household Light Bulbs," Applied Physics Letters, vol. 84, No. 24, Jun. 14, 2004.

* cited by examiner

CARBON NANOTUBE STRUCTURES AND METHODS OF MANUFACTURE AND USE

FIELD

The invention is directed to structures made from carbon nanotubes and methods of manufacture and use of the structures, as well as devices containing the structures. The invention is also directed to a method of making an elongated carbon nanotube structures, such as a filament or a wire, using a solid composition of polymer and carbon nanotubes, as well as the elongated carbon nanotube structures themselves and devices using the structures.

BACKGROUND

A carbon nanotube (CNT) can be described as a honeycomb lattice rolled into a cylinder. The carbon nanotube typically has a high aspect ratio and, therefore, possesses a high ratio of surface area to volume. Carbon nanotubes possess unique mechanical, thermal, and electrical properties. For example, carbon nanotubes can be highly conductive. Carbon nanotubes have also been shown to emit fluorescent light when excited by a laser beam of the appropriate wavelength and can emit incandescent light when current is allowed to pass through the nanotubes.

Carbon nanotubes have high mechanical strength by themselves. The interactions between carbon nanotubes produce non-chemical bond forces, such as Van der Waals forces, to maintain bundles of carbon nanotubes. To increase these forces, a close proximity between adjacent carbon nanotubes is desirable. One method for achieving this close proximity is the growth of dense groups of carbon nanotubes on a substrate.

BRIEF SUMMARY

One embodiment is a method of making a carbon nanotube structure. The method includes forming a plurality of carbon nanotubes and contacting the carbon nanotubes with a polymer. A solid composition is formed from the carbon nanotubes and polymer and then shaped. For example, the solid composition can be shaped into an elongated structure such as a filament, wire, rope, cable, and the like. In at least some instances, at least some or all of the polymer is removed from the solid composition after it is shaped.

Another embodiment is a carbon nanotube structure that includes a plurality of carbon nanotubes packed together and shaped to form the structure. The packing of the carbon nanotubes is enhanced by forming a solid composition of a polymer with the carbon nanotubes distributed therein prior to forming the structure from the carbon nanotubes.

Yet another embodiment is a light source that includes the carbon nanotube structure shaped as a filament.

Another embodiment is a method of making a light source. The method includes forming a filament by: forming a plurality of carbon nanotubes; contacting the carbon nanotubes with a polymer; forming a solid composition from the carbon nanotubes and polymer; and shaping the carbon nanotubes into a filament. The ends of the filament are coupled to a plurality of leads and the filament and leads are disposed in an envelope.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The invention is directed to structures made from carbon nanotubes and methods of manufacture and use of the structures, as well as devices containing the structures. The invention is also directed to a method of making an elongated carbon nanotube structure, such as a filament or wire. using a solid composition of polymer and carbon nanotubes, as well as the elongated carbon nanotube structures themselves and devices using the structures.

An elongated structure (or any other shaped structure) can be made using carbon nanotubes. Elongated structures typically have a relatively high aspect ratio of length:width. An elongated carbon nanotube structure can be used as, for example, a filament, wire, rope, cable, and the like. For example, a filament can be utilized in incandescent light sources (e.g., light bulbs) in place of metal filaments. In some instances, the carbon nanotube filament can be a direct replacement for the metal filament. It will be recognized that the carbon nanotube structure can have other shapes including non-elongated shapes.

A method for making a carbon nanotube structure includes forming the carbon nanotubes and then contacting the nanotubes with a polymer to form a solid composition between the polymer and the carbon nanotubes. This solid composition can then be shaped into the form of an elongated structure (or any other shape) and the polymer removed leaving a carbon nanotube structure. Alternatively, the polymer can be removed prior to shaping the carbon nanotubes into a final shape. Forming a solid polymer composition can further reduce the distance between adjacent carbon nanotubes and consequently results in closer proximity between carbon nanotubes.

Figure 1A:
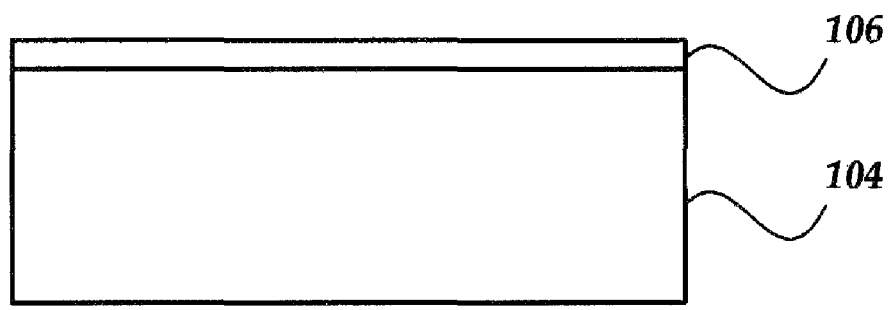
FIGS. 1A-1E illustrate steps in part of the process of the formation of a carbon nanotube structure, according to the invention.

FIGS. 1A-E illustrate a portion of one embodiment of a process to form a carbon nanotube structure. First, carbon nanotubes 102 are formed on a substrate 104 as illustrated in FIG. 1A. There are many methods that can be used to form carbon nanotubes and generally any of these methods is suitable. The carbon nanotubes are preferably formed so that they are aligned perpendicular to the surface of the substrate. In addition, the carbon nanotubes are, preferably, densely distributed on the substrate. For example, the density of the carbon nanotubes can be at least $5 \times 10^8/cm^2$ and, more preferably, at least $2 \times 10^9/cm^2$.

In one example of a method for the formation of carbon nanotubes, a silicon substrate 104 is prepared. Other suitable substrates include, but are not limited to, quartz, ceramic, and glass substrates. As illustrated in FIG. 1A, the top of the substrate 104 is coated with a thin layer 106 of a catalyst suitable for the preparation of the carbon nanotubes. Examples of suitable catalysts include, but are not limited to, iron, cobalt, nickel, platinum, palladium, molybdenum, chemical compounds of these metals, and combinations thereof. The catalyst layer can be formed by any process including chemical vapor deposition (CVD) and physical vapor deposition (PVD) processes, such as electron-beam evaporation, sputtering, and the like. In one embodiment, the thickness of the catalyst layer is about 2 to 10 nm.

Figure 1B:
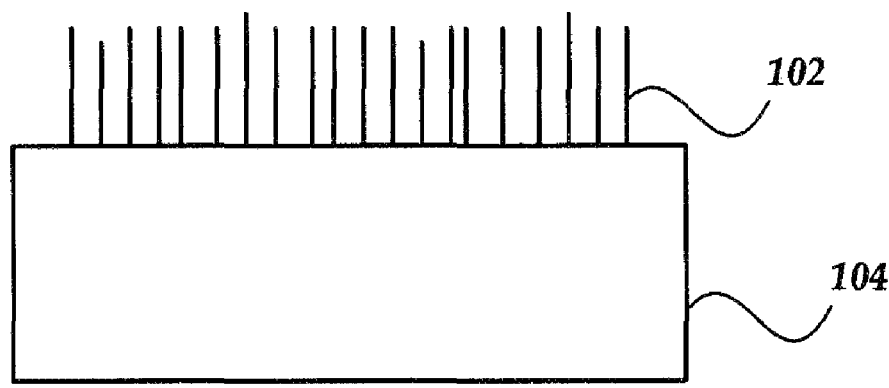

The carbon nanotubes 102 are then formed on the substrate 104 and in the presence of the catalyst layer (not shown), as illustrated in FIG. 1B. The nanotubes can be formed using any method including chemical vapor deposition (CVD) and plasma-enhanced chemical vapor deposition (PECVD) techniques. In one CVD process, hydrogen and ethylene gases are provided in a furnace heated to a temperature in the range of 650 to 1000° C. (for example, around 700° C.) The ratio of the gases can be selected to obtain desired carbon nanotube properties and growth rates. For example the gases can range from pure ethylene to 1:3 ethylene:hydrogen ratio. In at least some embodiments, the ratio of ethylene to hydrogen is in the range of 7:1 to 1:3. The growth time can range from 1 minute to 60 minutes or more. Variations in temperature, growth time, and gas ratio can change nanotube parameters such as, for example, diameter, height, conformation, etc. It will be understood that this is one example of a method of preparing carbon nanotubes. Other methods of preparing carbon nanotubes can use, for example, different gases and gas ratios, different temperatures, and different growth times.

Generally, the diameter and length of the carbon nanotubes will depend, at least in part, on the process parameters (e.g., temperature, time, ratio of gases, etc.) and gases used in growing the nanotubes. In addition, some nanotube formation techniques grow single-walled nanotubes and others techniques grow multi-walled nanotubes. In one example, multi-walled carbon nanotubes were grown at 700° C. for 25 minutes on a silicon substrate with iron catalyst layer. Different mixtures of gases were used including a mixture containing 100 sccm (standard cubic centimeters per minute) hydrogen and 690 sccm ethylene and a second mixture containing 400 sccm hydrogen, 400 sccm ethylene, and 400 sccm argon. The resulting carbon nanotubes had an average height of about 150 micrometers and a diameter in the range of 20 to 40 nm.

Figure 1C:
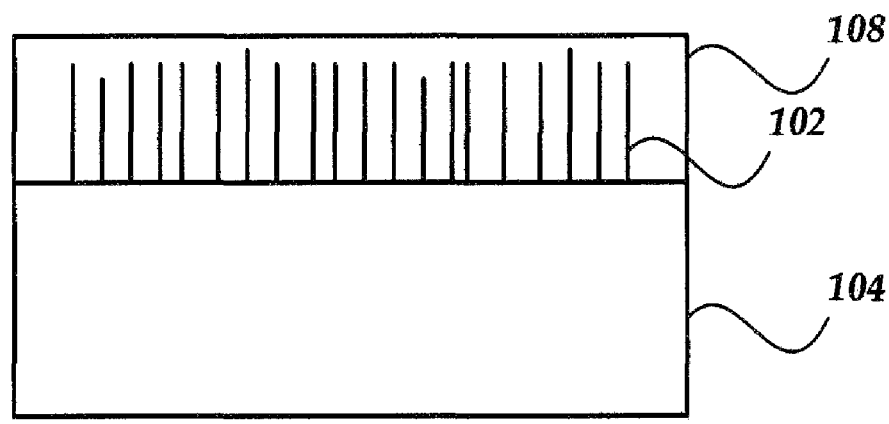

After the carbon nanotubes 102 are grown, a polymer composition 108 is provided over the nanotubes, as illustrated in FIG. 1C. This polymer composition includes at least a polymer and, optionally, a solvent. In some instances, the polymer may act as its own solvent. In other instances, a solvent is provided with the polymer.

Any method can be used for depositing the polymer composition on the carbon nanotubes including dip coating, spin coating, knife coating, spraying, and the like. The solvent should not substantially solvate the carbon nanotubes or the substrate. Preferably, the polymer composition is sufficiently fluidic to permit uniform coverage of the carbon nanotubes.

Any polymer can be used in the polymer composition 108. Preferably, the polymer is soft and flexible, not brittle, upon removal of any solvent. Polymers with such characteristics often have a glass transition temperature that is no more than the temperature at which the procedures of shaping the polymer composition are performed. For example, the glass transition temperature may be 25° C. or room temperature or less. More preferably, the polymer is glassy, tacky, and soft at room temperature or 25° C., upon removal of the solvent. In addition, the polymer is preferably soluble in water or an organic solvent that does not solvate the carbon nanotubes. Examples of suitable polymers include polyvinyl methyl ether (PVME), polyacrylates, polyvinyl alcohol, and polyvinylpyrrolidone. As an example, 1-3 ml of a 1.2% PVME aqueous solution can be disposed on carbon nanotubes disposed on a 1.5×2.5 inch (about 3.8×6.3 cm) substrate.

It will be understood that the term "polymer" includes, but is not limited to mixtures or other combinations of polymeric materials, as well as copolymers and the like. In addition to the polymer and solvent, the polymer composition can also include one or more additives, such as surfactants, plasticizers, antioxidants, filler, tackifiers, co-solvents, and the like.

Figure 1D:
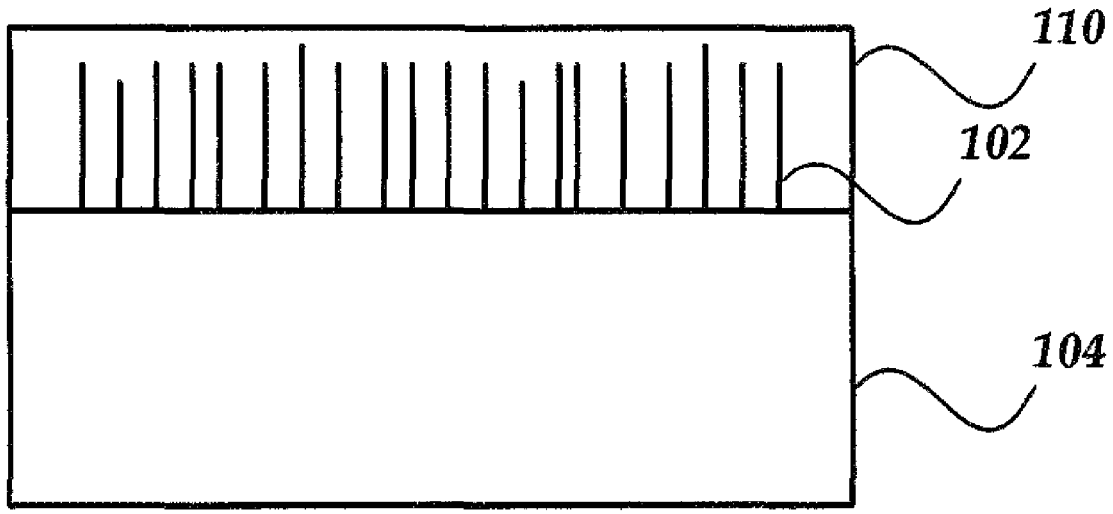

Once the polymer composition 108 is disposed over the carbon nanotubes 102, the solvent, if present, is at least partially removed to produce a solid composition 110 of the carbon nanotubes and polymer, as illustrated in FIG. 1D. Preferably, substantially all of the solvent is removed. In at least some embodiments, as the solvent is removed, at least some of the nanotubes (or the upper regions of the nanotubes) are pulled closer together to produce clusters of nanotubes with intervening gaps when viewed from above. This can result in a tighter packing between the nanotubes and can produce higher mechanical strength to the carbon nanotube structure, and particularly for elongated carbon nanotube structures.

Figure 1E:
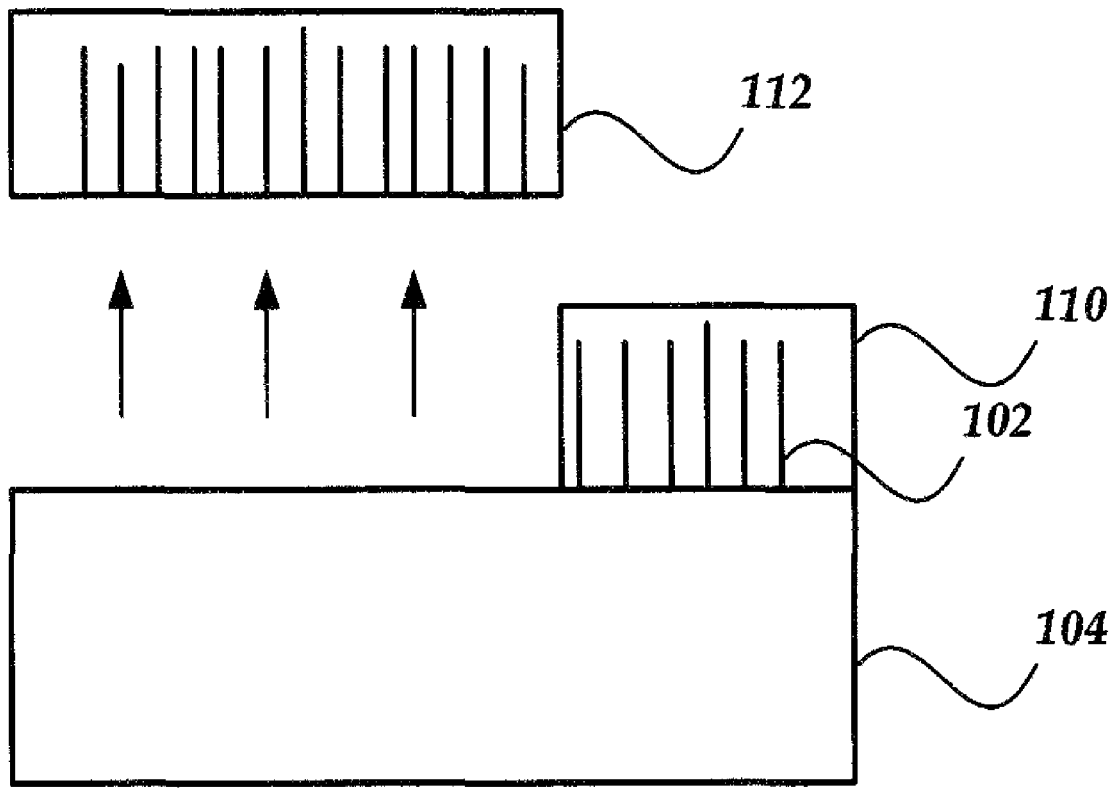

At least a portion 112 of the solid composition 110 of polymer and carbon nanotubes can be removed from the substrate 104, as illustrated in FIG. 1E. In one embodiment, the portion 112 is removed from the substrate using a blade or other instrument to separate the solid composition from the substrate. It will be understood that the portion 112 can include all of the solid composition 110.

The portion 112 of the solid composition 110 can then be formed into a shape, for example, a filament or wire shape (or any other desired shape.) For example, the portion 112 can be rolled manually or using a mechanical device into an elongated filament or wire shape. Once in the desired shape or during shaping, at least a portion (and preferably, all) of the polymer can be removed. In one embodiment, at least a portion of the polymer is removed by using a solvent that solvates the polymer and not the carbon nanotubes. The solvent can be dripped or otherwise poured over the carbon nanotube structure to remove the polymer or the carbon nanotube structure can be placed in the solvent.

Additionally or alternatively, ends of the carbon nanotube structure can be connected to a current source and a current can be allowed to pass through the structure to heat the structure and burn out the polymer. The carbon nanotube structure may be washed to remove residue of the polymer. In some embodiments, this burn out of the polymer may be accomplished during the initial use of the carbon nanotube structure in a light source or other electrical device.

As yet another method to remove the polymer (for use alone or in combination with the previously described methods, the carbon nanotube structure can be heated in a furnace, preferably, in an inert atmosphere such as an argon atmosphere. The temperature of the furnace and the period for heating can vary. For example, the carbon nanotube structure can be heated in an 850° C. furnace for at least 30 minutes.

In another embodiment, after forming the structure illustrated in FIG. 1D the polymer of the solid composition can be removed prior to separating the carbon nanotubes from the substrate. For example, a solvent of the polymer can be used to remove at least a portion (or even, all) the polymer from the carbon nanotubes while the nanotubes are still disposed on the substrate. For example, the solvent can be dripped, sprayed, or otherwise disposed on the substrate and the polymer/solvent can be allowed to drain off the substrate. Alternatively, the substrate, polymer, and carbon nanotubes can be dipped into the solvent. Alternatively or additionally, the carbon nanotubes and substrate can be heated in a furnace to remove at least a portion of the polymer.

After removing the polymer, at least a portion of the remaining carbon nanotube structure can be separated from the substrate as described above and then shaped into a filament, wire, rope, cable, or other form. In some instances, removal of the carbon nanotubes from the substrate occurs while the nanotubes are still moist from the polymer solvent. Residual polymer can be removed from the carbon nanotube structure using additional solvent, running current through the structure, and/or by heating the structure, as described above.

Figure 2:
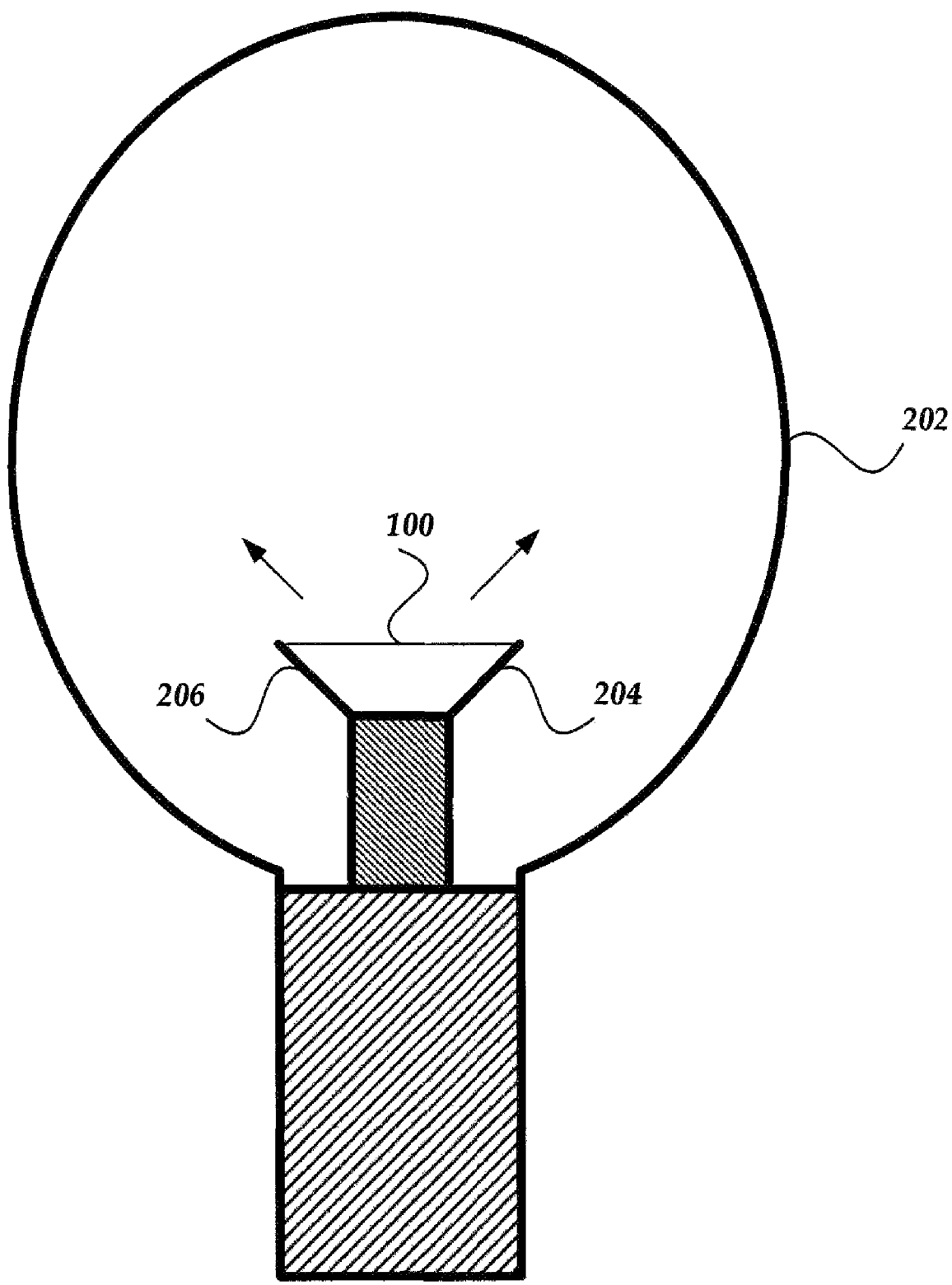
FIG. 2 is schematic front view of one embodiment of a light source containing a carbon nanotube filament, according to the invention.

FIG. 2 illustrates one embodiment of a light source 200. The light source includes a carbon nanotube filament 100 disposed in an envelope 202 and coupled to leads 204, 206. Preferably, the envelope includes an inert atmosphere, such as an argon atmosphere, to increase the lifetime of the filament as a light source. Current can be allowed to pass through the filament 100 by connecting the leads 204, 206 to a power source (not shown.) The current heats the filament until it glows and provides incandescent light. In some embodiments, it is found that the carbon nanotube filament, made as described above, has a lower threshold power than a conventional tungsten light bulb and the irradiance intensity of the carbon nanotube filament increases more quickly with an increase in power.

Other applications for the carbon nanotube structures (particularly elongated structures) include as a conductive wire, a rope or mechanical cable, a heat pipe, a fuel cell, or as a sensor. For example, the carbon nanotubes formed as an elongated structure or in another shape can be used as a gas detector by observing changes in electrical properties (e.g., resistance, conductivity) with changes in gas pressure or concentration. The carbon nanotubes structures are particularly sensitive to changes in gas pressure or concentration because of the very high surface area per unit volume of the carbon nanotubes which provide more area for adsorption or absorption of gas molecules.

The above specification, examples and data provide a description of the manufacture and use of the composition of the invention. Since many embodiments of the invention can be made without departing from the spirit and scope of the invention, the invention also resides in the claims hereinafter appended.

The invention claimed is:

1. A method of making a carbon nanotube structure, the method comprising:
   forming a plurality of substantially aligned carbon nanotubes on a substrate;
   contacting the carbon nanotubes on the substrate with a polymer;
   forming a solid composition from the carbon nanotubes and the polymer on the substrate;
   removing at least a portion of the solid composition from the substrate;
   shaping the removed portion of the solid composition into a filament while substantially retaining alignment of the carbon nanotubes within the solid composition;
   removing at least a portion of the polymer after shaping the solid composition into the filament, wherein the filament retains its shape;
   coupling opposite ends of the filament to electrically conductive leads, and
   disposing the filament in a sealed envelope to form a light bulb.

2. The method of claim 1, wherein contacting the carbon nanotubes with a polymer comprises contacting the carbon nanotubes with a polymer composition comprising the polymer and a solvent.

3. The method of claim 2, wherein forming a solid composition comprises removing a majority of the solvent from the polymer composition.

4. The method of claim 2, wherein forming a solid composition comprises removing substantially all of the solvent from the polymer composition.

5. The method of claim 1, wherein shaping the removed portion of the solid composition and removing at least a portion of the polymer comprises shaping at least a portion of the solid composition and then removing the polymer, wherein a remaining portion of the solid composition retains its shape.

6. The method of claim 1, wherein the glass transition point of the polymer is no higher than 25° C.

7. The method of claim 1, further comprising removing at least a portion of the polymer by attaching the filament to electrically conducting leads and providing current through the filament via the leads, to remove the portion of the polymer.

8. The method of claim 1, wherein removing at least a portion of the polymer comprises removing substantially all of the polymer.

9. A method of making a carbon nanotube structure, the method comprising:
   forming a plurality of substantially aligned carbon nanotubes on a substrate;
   contacting the carbon nanotubes on the substrate with a polymer;
   forming a solid composition from the carbon nanotubes and the polymer on the substrate;
   removing at least a portion of the solid composition from the substrate;
   shaping the removed portion of the solid composition while substantially retaining alignment of the carbon nanotubes within the solid composition; and
   removing substantially all of the polymer from the solid composition after shaping the solid composition, wherein a remaining portion of the solid composition retains its shape.

10. The method of claim 9, wherein shaping the removed portion of the solid composition comprises rolling the removed portion of the solid composition to form the carbon nanotube structure as an elongated structure.

11. The method of claim 9, wherein shaping the removed portion of the solid composition and removing substantially all of the polymer comprises shaping at least a portion of the solid composition and then removing the polymer, wherein a remaining portion of the solid composition retains its shape.

12. The method of claim 9, wherein the glass transition point of the polymer is no higher than 25° C.

13. The method of claim 9, further comprising coupling opposite ends of the carbon nanotube structure to electrically conductive leads.

14. The method of claim 9, wherein shaping the removed portion of the solid composition comprises shaping the removed portion of the solid composition into a filament for a light bulb.

15. The method of claim 14, further comprising removing at least a portion of the polymer by attaching the filament to electrically conducting leads and providing current through the filament, via the leads, to remove the portion of the polymer.

16. A method of making a light bulb, comprising:
   forming a filament for the light bulb by
      forming a plurality of substantially aligned carbon nanotubes on a substrate, contacting the carbon nanotubes on the substrate with a polymer, forming a solid composition from the carbon nanotubes and the polymer on the substrate, removing at least a portion of the solid composition from the substrate, shaping the carbon nanotubes in the removed portion of the solid composition into a filament while substantially retaining alignment of the carbon nanotubes within the solid composition, and removing substantially all of the polymer after shaping the solid composition, wherein a remaining portion of the solid composition retains its shape as a filament;

coupling ends of the filament to a plurality of leads; and disposing the filament and leads in an envelope to form a light bulb in which the filament emits visible light.

17. The method of claim 16, wherein removing at least a portion of the polymer comprises removing substantially all of the polymer from the solid composition.

18. The method of claim 16, wherein the filament is configured and arranged to emit visible light when electrical current flows through the filament.

19. The method of claim 16, further comprising removing at least a portion of the polymer by providing current through the filament, via the leads, to remove the portion of the polymer.

\* \* \* \* \*